June 11, 1963   M. J. WOOD   3,092,962
CASINGS FOR ROCKET MOTORS
Filed March 16, 1960
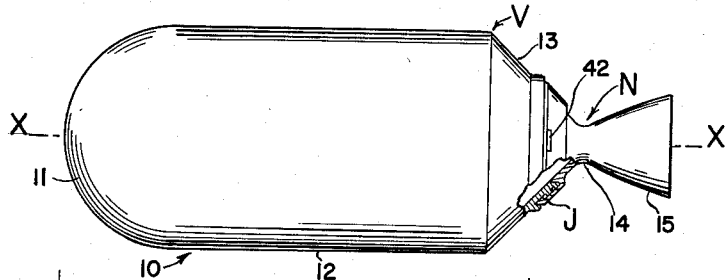
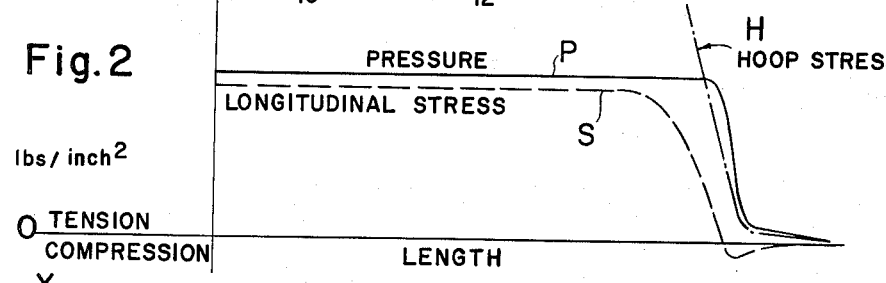
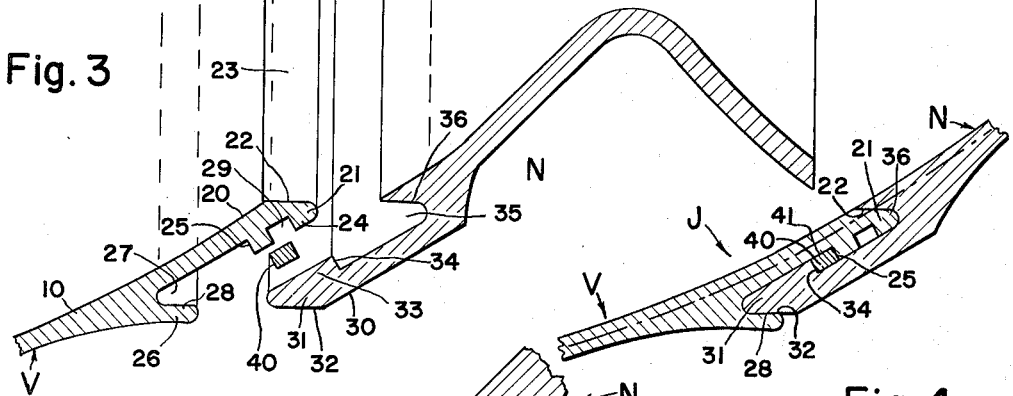
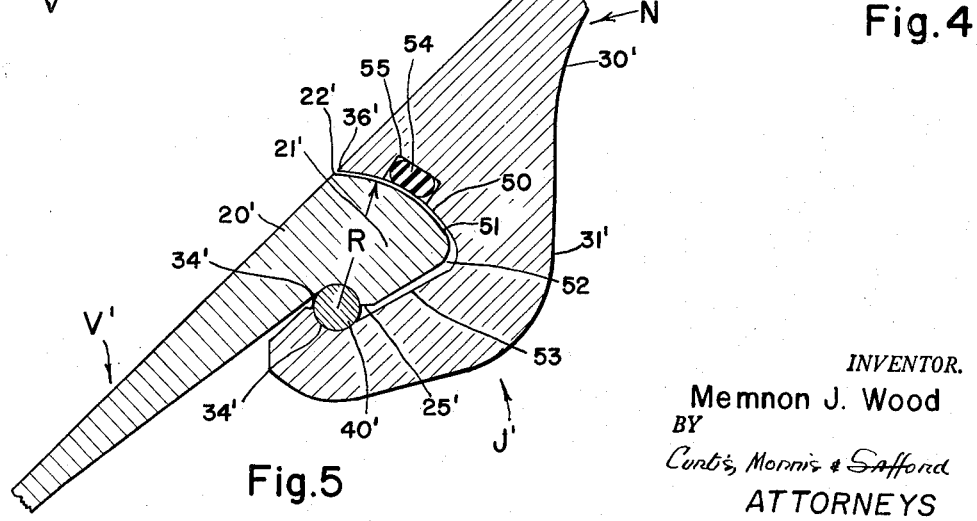
INVENTOR.
Memnon J. Wood
BY
Curtis, Morris & Safford
ATTORNEYS

United States Patent Office 3,092,962
Patented June 11, 1963

---

3,092,962
CASINGS FOR ROCKET MOTORS
Memnon J. Wood, Huntsville, Ala., assignor to Thiokol
Chemical Corporation, Bristol, Pa.
Filed Mar. 16, 1960, Ser. No. 15,408
9 Claims. (Cl. 60—35.6)

The present invention relates to long range rocket motors and more particularly to joining separable parts of a rocket motor casing.

Most rocket motors compise a cylindrical casing forming a combustion chamber for propellant and a nozzle at one end through which the products of combustion escape to propel the rocket. The casings of such rocket motors are made in separable parts to adapt the casing to be loaded with propellant before the nozzle is attached. The rocket casing must have walls of sufficient thickness to withstand the radial and longitudinal forces without rupture produced by pressure as a result of the burning propellant, but the walls should be made as thin as possible to maintain the weight of the rocket casing at a minimum. Therefore, the joint between the two parts of the casing must be strong enough to withstand the force tending to separate the parts and any additional increase in the thickness of the wall at the joint merely increases the weight of the rocket and the force required to propel it in flight.

Different types of joints have been proposed for connecting the nozzle to the propellant-containing vessel, but each of the joints proposed has some structural feature which renders it difficult to manufacture or assemble and all require a substantial amount of additional material in the walls of the parts at the joint in order to overcome the discontinuity stresses in the material caused by the geometry of the closure itself. This additional thickness of the material at the joint materially increases the weight of the structure. For example, bolted flanges on the parts require alignment of the holes and the placing and fastening of the bolts while the parts are supported in axially aligned relationship. Interlocking splines also have been proposed which require expensive machining operations and relative rotation of the parts to lock the splines. In the latter instance it is often difficult to secure the joint in locked position and produce a good seal around its periphery.

It must further be recognized that in cylindrical pressure vessels, pressure causes stresses to be induced in the wall of the vessel, and that in thin-walled cylinders in particular, such as are employed in rocket motors (wherein the ratio of outside diameter to inside diameter of the cylinder is less than 1.10 to 1.00) such stresses are reducible to hoop stress, radial stress and longitudinal stress. In the case of a cylinder subject to internal pressure, as a rocket motor, the hoop and longitudinal stresses are tensile (except in those locations specified hereinafter), and for a thin-walled cylinder the longitudinal stress is only about one-half of the hoop stress and so is never controlling. In the design of a joint or closure in a thin-walled cylinder, therefore, it is desirable to introduce as few discontinuities as possible in the hoop fibers (or tension field) so as to keep to a minimum the amount of extra material needed in the joint to withstand the hoop stress. Fiber discontinuities in the longitudinal plane should naturally be minimized as much as possible.

One of the objects of the present invention is to provide an improved joint between the separable parts of a rocket motor casing which materially reduces the thickness of the walls required at the joint and the weight of the rocket casing.

Another object is to provide a joint whose geometry is such that it introduces few if any fiber discontinuities in the hoop tension field, restricts the discontinuities entirely to the meridonal stress field and holds these discontinuities to a minimum thereby reducing the material required to effect the closure to a minimum.

A further object is to provide a joint which maintains a smooth contour on the inside surface of the casing and in which the longitudinal stress is transferred continuously around the periphery of the casing across the joint instead of being transferred intermittently, thereby eliminating longitudinal stress concentrations at points of transfer.

Still another object is to provide a peripheral joint between the two parts of a rocket motor casing which is located as close as possible to a point along the rocket motor casing in the immediate vicinity of the rocket motor exhaust expansion nozzle where the longitudinal tensile stress is at a minimum.

Another object is to provide a rocket casing of separate parts which are joined by moving the parts axially into interengaging relationship and interlocked by a key.

Still another object is to provide a joint between the parts of a rocket casing which is of simple construction to adapt it for economical manufacture, facilitates assembly of the parts and one which is reliable in holding the parts in assembled relationship.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims.

In the drawing:

FIGURE 1 is a side elevational view of a two part rocket motor casing incorporating the novel joint of the present invention located on a converging section of the casing;

FIGURE 2 is a chart having curves illustrating the pressure drop along the rocket motor, the longitudinal stress in the casing along the rocket motor which changes from tension to compression at a location forward of the minimum throat area and hoop stress;

FIGURE 3 is a longitudinal sectional view through the joint at one side of the axis of revolution and showing the parts in aligned axially spaced relationship;

FIGURE 4 is a view similar to FIGURE 3 showing the parts moved axially into nested interlocking engagement at each end of the joint; and FIGURE 5 is a sectional view similar to FIGURE 4 of a joint of modified construction which permits relative free rotation of the end portions of the parts about the center of the circular key.

FIGURE 1 of the drawing illustrates a rocket having an outer wall or casing 10 which is symmetrical about an axis of generation X—X. The casing has a forward end 11 of generally spherical shape, a cylindrical section 12 adjacent the spherical end, a converging section 13, a throat section 14 and a diverging section 15 at its rearward end. The spherical end 11 and cylindrical section 12 constitute a pressure vessel V; and the converging section 13, throat section 14 and diverging section 15 constitute a nozzle N. The nozzle N at the rearward end of the casing 10 converts pressure energy in the pressure vessel V to velocity as it flows therethrough and escapes from the rocket motor.

The pressure vessel V contains a propellant which when ignited, burns at a predetermined rate to provide products of combustion in the casing at high pressure. Many such rocket motors use solid propellants of a rubber-like polymer which is cast in a fluid state and then cured in situ to produce a solid elastomer which is thereby bonded to the walls of the pressure vessel V in a solid mass. To facilitate the casting of solid propellants, the casing 10 is made in two parts comprising the pressure vessel V having an open end and the nozzle N to permit withdrawal of a mandrel or core after curing.

The invention resides in part in locating the peripheral joint J as close as possible to the point of minimum longitudinal and hoop stress in tension (and minimum cross-sectional area of the casing), and yet far enough forward along the length of the casing to allow the mandrel or core to be withdrawn after the propellant has been cured; in part in the structure of the joint J which facilitates the assembly and attachment of the parts V and N; in part in reducing the material required and weight of the joint; and finally in resolving all the longitudinal stresses along the slope of the converging section 13 of the casing 10.

The chart in FIGURE 2 shows an ordinate indicating pressure in lbs./inch$^2$ and an abscissa corresponding to the length of the rocket motor casing 10. A curve P on the chart indicates the drop in pressure of the products of combustion in the casing 10 along the rocket motor, curve S indicates the longitudinal stress or load in the casing at successive points along the rocket motor and the curve H indicates the hoop stress. It will be noted by reference to FIGURE 2 that the pressure of the products of combustion resulting from burning the propellant is substantially constant from the forward end of the rocket motor and along the cylindrical section 12 to a point adjacent its end and then falls off rapidly along the converging, throat and diverging sections 13, 14 and 15. It will further be observed from the curve S that the longitudinal stress in the casing 10 decreases along its length and changes from tension to compression at a location in the converging section 13. In other words, at a particular point along the converging section 13 the longitudinal stress on the casing is zero. This results from the conversion of pressure head into kinetic energy (velocity head) in the converging diverging sections 13 and 15 of the nozzle N. It will be observed from the curve H that the hoop stress also decreases along the converging section 13. In accordance with the present invention, the joint J between the pressure vessel V and nozzle N is located at a point as near as possible to the point of zero separation load.

FIGURES 3 and 4 illustrate the construction of the joint forming end portions of the pressure vessel V and nozzle N. As will be observed from FIGURE 1, the converging section 13 is of generally conical shape. The conical end portion 20 of the pressure vessel V comprises an annular rim 21 having a face 22 parallel with the axis of generation X—X and forming an opening 23 in the end of the vessel. The rim 21 has an annular pad 24 projecting outwardly from the end portion 20 of the casing wall 10 which forms an annular shoulder 25 normal to the conical wall. Spaced forwardly from the shoulder 25 is an outwardly projecting lip 26 which forms an annular recess 27 also having a face 28 parallel to the face 22 and axis of generation X—X. Pad 24 has an annular recess 29 to enclose an O-ring seal.

The forward end 30 of the nozzle N has an annular rim 31 with an outer face 32 parallel with the axis of generation X—X. Rim 31 also has an inwardly projecting pad 33 forming an annular shoulder 34 normal to the conical wall. Rearwardly of the shoulder 34, nozzle N has an annular recess 35 with an annular face 36 at its inner edge parallel with face 32 and axis of generation X—X. The annular rim 21 on vessel V has a shape complementary to the recess 35 in the nozzle N, the rim 31 on the nozzle has a shape complementary to the recess 27 in pressure vessel V and the surfaces 22 and 32 on the rims 21 and 31 have substantially the same diameter as the surfaces 36 and 28 of the recesses 35 and 27. Furthermore, it will be noted that the outer corner of the shoulder 25 on the pressure vessel V has a radius from the axis of generation X—X slightly less than the radius of the inner corner of the shoulder 34 on the nozzle N.

Nozzle N is mounted on the pressure vessel V by merely moving it axially from the position illustrated in FIGURE 3 to that illustrated in FIGURE 4 so that the annular rims 21 and 31 of the separate parts interlock with the recesses 35 and 27, respectively, with horizontal parting surfaces 22, 36 and 28, 32 parallel with the axis of generation X—X. After the parts have been assembled they are locked by a key or keys 40 inserted into the keyway 41, see FIGURE 4, formed between the spaced shoulders 25 and 34 of the separate parts V and N. The key 40 may be inserted as a snap ring through an opening 42 in the end portion 30 of the nozzle N which overlies the keyway 41, see FIGURE 1, or a plurality of key slugs may be inserted through the opening 42 and moved around the periphery of the keyway between the shoulders 25 and 34 for holding the rims in interlocking engagement. Furthermore, it will be observed that any longitudinal stress along the wall of the casing 10 will be transmitted continuously to the key in compression along the slope of the conical section 13 of rocket motor casing 10. Any bending or hoop stress on the joint will be opposed by the interlocked rims 21, 31 and annular recesses 35 and 27 at the ends of the joint J.

FIGURE 5 illustrates a joint of modified construction in which the end portion 20' of the pressure vessel V' has an outwardly projecting annular rim 21' and the end portion 30' of the nozzle N has an annular rim 31' with inner and outer edges 22', 36' and shoulders 25', 34' adapted to clear each other as the nozzle N' is moved axially toward the open end of the pressure vessel V'. The shoulders 25' and 34' are of arcuate form to receive a circular key 40' in the same manner as previously described which locks the parts in assembled relation. However, in the modified construction, the adjacent edges 50 and 51 of the rims 21' and 31' are of arcuate shape transversely of the joint J' about a radius R from the center of the circular key 40'. The edges 52 and 53 at the sides of the rim 20' and 30' longitudinally of the joint J' are spaced from each other in the modified construction. The arcuate edges 50 and 51 of the parts and the spaced edges 52 and 53 permit relative rotation of the elements V' and N' about the center of key 40', thus permitting transfer by the key of separating loads and thereby eliminating transfer of discontinuity bending moments across the closure. The joint J' illustrated in FIGURE 5 is also located at the point of minimum longitudinal stress in the casing 10, the same as in the form of construction illustrated in FIGURES 1 to 4. In other words, instead of interlocking the overlapping parts of the joint J in the construction illustrated in FIGURES 1 to 4 to oppose lateral flexing, the joint illustrated in FIGURE 5 permits such flexing between the parts. An annular O-ring seal 54 is provided in a recess 55 in the end portion 30' of the nozzle N' to hold the rims 21' and 31' tightly engaged with the key 40' and also to act as a seal for preventing gas leakage through the joint.

It will now be observed that the present invention provides an improved joint between separable parts of a rocket motor casing which materially reduces the thickness of the walls required and the weight of the joint portion of the casing. It also will be observed that the present invention provides a peripheral joint between separate parts of a rocket motor casing which is located at a position along the rocket motor where the longitudinal stress is at a minimum. It also will be observed that the present invention provides a construction in a two part rocket motor casing which adapts the parts to be moved axially into interlocking engagement and held by a key. It will still further be observed that the present invention provides a joint between the parts of a rocket motor casing which is of simple construction to adapt it for economical manufacture, facilitates assembly of the parts and one which is reliable in holding the parts in assembled relationship.

While two embodiments of the invention are herein illustrated and described, it will be understood that further changes may be made in the construction and arrangement of elements. The term "solid propellant charge" as used in the claims is intended to exclude free flowing liquids, but does include soft gels and rubber-like substances in which some movement of constituent molecules may take place. Therefore, without limitation in this respect, the invention is defined by the following claims.

I claim:

1. In a rocket motor, a two part casing having successive converging and diverging sections with a throat therebetween to provide a nozzle at one end through which the propellant gases escape, the parts of the casing being separable to provide an opening of a size sufficient for permitting a solid propellant charge to be placed in the casing forwardly of the nozzle throat, said nozzle converting pressure of propellant gases to thrust as it passes therethrough and producing stresses longitudinally of the casing which change from tension to compression along the converging section, and a peripheral joint on the converging section of the casing for connecting the separate casing parts, said joint being formed by the ends of the casing parts telescoped one in the other and so shaped as to form opposing shoulders normal to and in the plane of the converging section, a key between said shoulders to complete the joint, and said joint being located at a place along the inclined converging casing section nearest to the point of zero longitudinal load in the casing to provide the minimum opening required to insert solid propellant charge whereby reducing the longitudinal stress on the joint to a minimum.

2. A self propelled rocket having a motor casing comprising a vessel and a separate nozzle at one end of the vessel, the adjacent ends of the vessel and nozzle being inclined and cooperating to form a continuous converging surface, a joint between the vessel and nozzle on said converging surface comprising overlapping ends of a shape to nest and seat one in the other, an annular rim projecting outwardly from the overlapping end portion of the wall of the vessel to form an annular shoulder normal to the slope of the converging surface, an annular rim projecting inwardly from the overlying end portion of the wall of the nozzle to provide an annular shoulder normal to the slope of the converging surface, the inner periphery of the rim on the nozzle having a diameter greater than the outer diameter of the rim on the vessel to adapt the nozzle to slide axially over the end of the vessel and position its annular shoulder in spaced relation to the annular shoulder on the vessel along the converging surface, and an annular frusto-conical key in the space between the shoulders whereby the key is in compression between the annular shoulders on the converging surface.

3. A rocket motor casing in accordance with claim 2 in which the end portions of the vessel and nozzle are formed to provide annular recesses interlocking with the rims at each end of the joint with parting surface parallel to the axis of the casing.

4. A rocket motor casing in accordance with claim 3 in which the ends of the rims have a rounded contour from cylindrical surfaces parallel to the axis of the casing to the inclined converging surface of the casing.

5. A rocket motor casing in accordance with claim 2 in which the rims on adjacent parts are curved transversely to the slope of the converging section to adapt the parts to rotate relative to each other upon radial flexing of the casing and nozzle.

6. A rocket motor casing in accordance with claim 5 in which the shoulders on the rims are of circular contour, a circular key between the rims, the adjacent edges of the parts at one side of the key being of arcuate shape about the axis of the key to permit relative rotation, and a resilient bushing on one of the parts engaging the arcuate edge of the other part to tightly engage the parts with the key and to maintain a gas seal.

7. A rocket motor casing having a nozzle at one end comprising two parts concentric around an axis of generation with adjacent ends on an inclined converging surface, each part of the casing having an annular rim at its edge forming an annular shoulder, at least one of the parts being formed to provide an annular recess interlocking with the rim on the other part, the rims on the two parts being telescoped axially into overlapping relationship to position the annular shoulders of the parts in opposed spaced relationship, the rim on one part projecting into the recess on the other part, and a key in the annular space between the opposed shoulders to hold the ends of the parts in interlocked assembled relation.

8. A rocket motor casing in accordance with claim 7 in which each part has an annular recess engaged by and interlocking with the rim of the other part at each end of the joint.

9. A rocket motor casing in accordance with claim 7 in which adjacent surfaces of the rim on one part and recess on the other part are of arcuate form having a radius around the axis of the key.

References Cited in the file of this patent

UNITED STATES PATENTS

| | | |
|---|---|---|
| 1,959,511 | Venzie | May 22, 1934 |
| 2,426,526 | Rutishauser et al. | Aug. 26, 1947 |
| 2,436,407 | Stephens | Feb. 24, 1948 |
| 2,500,334 | Zucrow | Mar. 14, 1950 |
| 2,597,482 | Harrison et al. | May 20, 1952 |
| 2,761,279 | Smith | Sept. 4, 1956 |
| 2,793,779 | Woods | May 28, 1957 |
| 2,895,635 | Pollard et al. | July 21, 1959 |